Patented Feb. 19, 1952

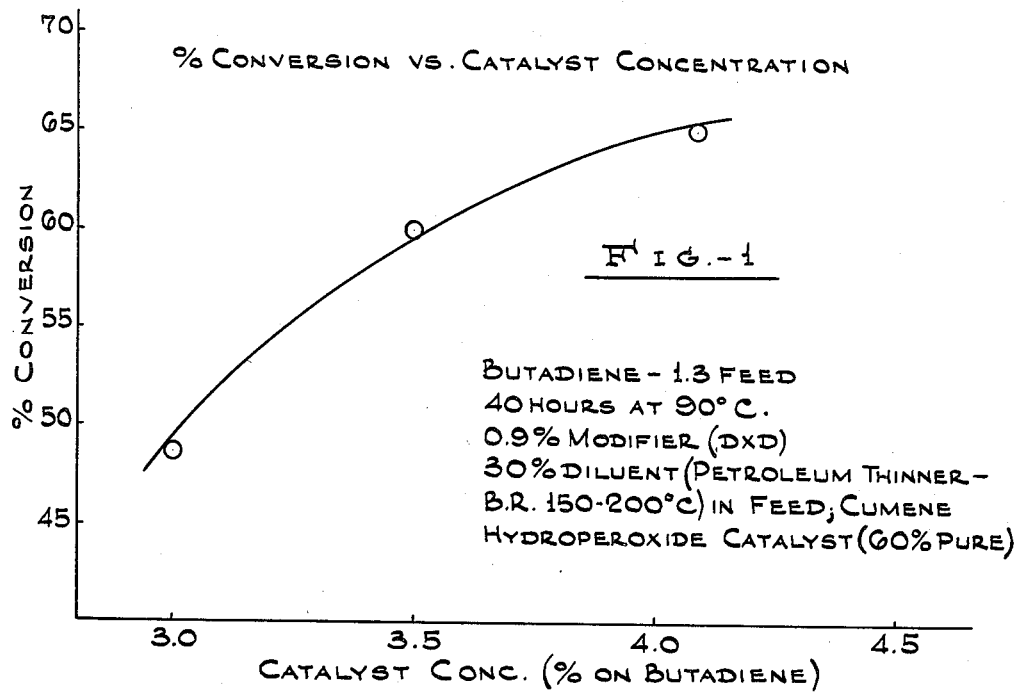
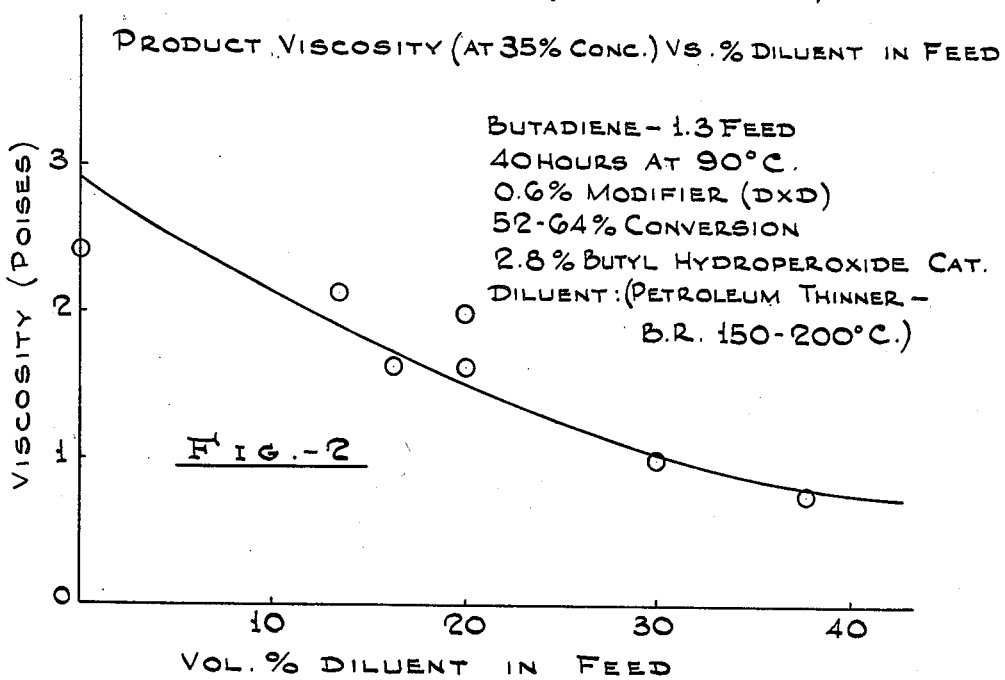

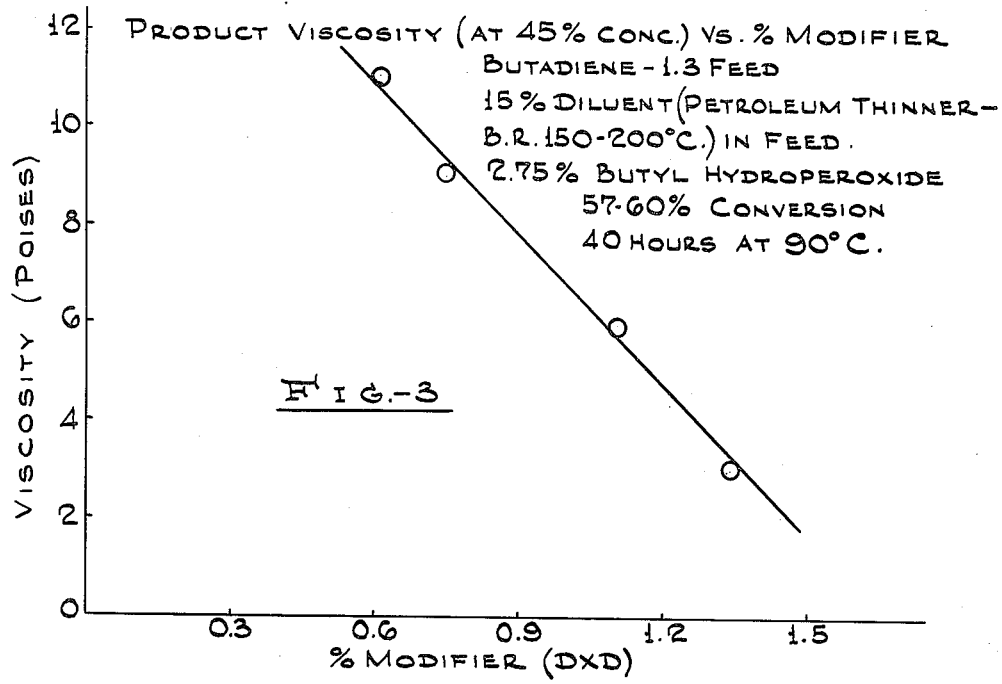
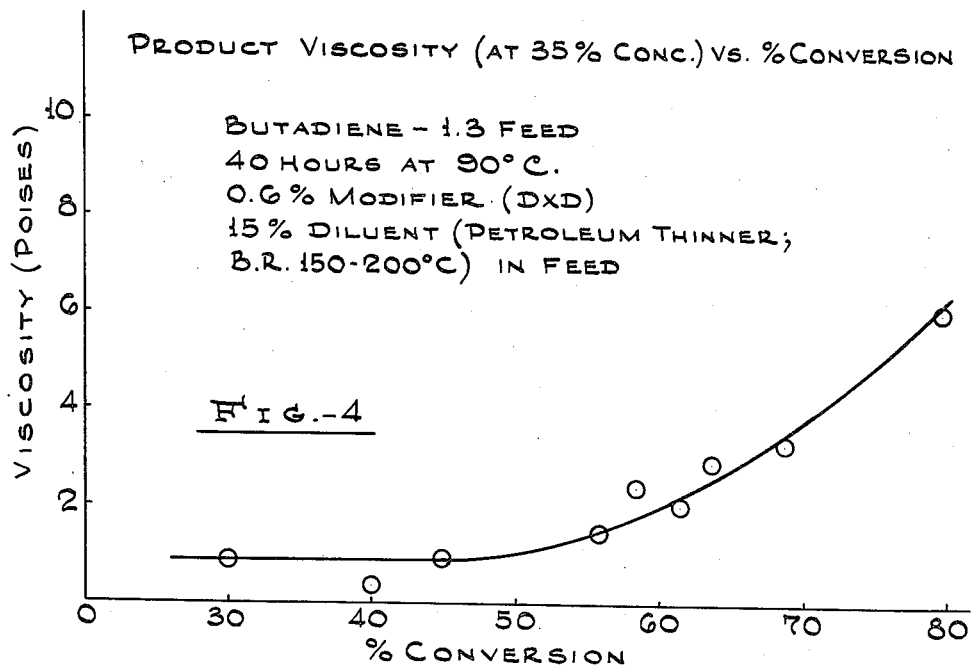

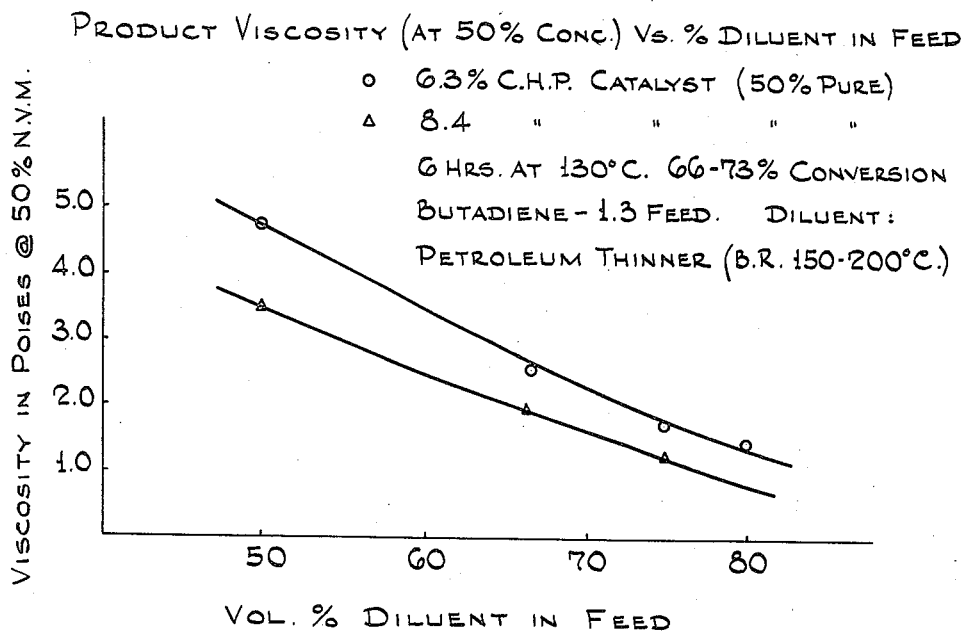

2,586,594

UNITED STATES PATENT OFFICE 2,586,594

PREPARATION OF DRYING OILS FROM DIOLEFINS

Erving Arundale, Anthony H. Gleason, and Fred W. Banes, Westfield, N. J., assignors to Standard Oil Development Company, a corporation of Delaware Application October 29, 1947, Serial No. 782,850

9 Claims. (Cl. 260—680)

This invention relates to synthetic drying oils and more particularly to the manufacture of oily linear polymers by the bulk polymerization of a diolefin or a mixture of a diolefin with a vinyl compound at a relatively low temperature and in the presence of a peroxide catalyst.

Several methods have been known heretofore for producing oily products by polymerizing diolefins such as butadiene, its homologs, or mixtures of diolefins with vinyl compounds. However, the old methods and the products resulting therefrom have been characterized by many disadvantages. Thus, for instance, British Patent 328,908 discloses the formation of drying oils by extended heating of butadiene under pressure and at temperatures above 40° C. or even above 300° C., and suggests the use of amines and finely divided metals as optional catalysts. However, this method has been found to be very uneconomical because a large proportion of the butadiene feed is dimerized to vinyl cyclohexene which must be separated from the desired polymeric drying oil, or, if temperatures above 250° C. are employed, the dimer may in fact represent the principal product which may be polymerized further to form cyclic resins of relatively low molecular weight. These are so brittle as to be relatively useless for protective coatings. Furthermore, the oily polymers obtained by this method are quite dark in color, especially when prepared at temperatures above 250° C.

Another method has been disclosed in British Patent 363,348, wherein it was proposed to polymerize diolefins in the presence of molecular or gaseous oxygen, further catalysts such as various metals or amines also having been suggested therein. However, this method, like the one mentioned above, is seriously handicapped by the fact that the polymerization rates are quite slow at low temperatures, whereas at temperatures above 100° C. dimer formation is again greatly increased at the expense of the desired linear polymers. At any rate, the oxygen-catalyzed oily products have been observed to have a distinct yellow color as well as a pronounced odor indicating that the molecular oxygen reacts at least in part with the butadiene to form undesirable by-products. In accordance with this observation, films obtained by drying such oxygen-catalyzed oily polymers have noticeably inferior resistance to solvents, particularly to those which possess oxygen-containing functional groups such as acetone, ether and the like.

Drying oils have also been prepared in the past by polymerizing diolefinic mixtures in aqueous emulsion. This method, however, has the disadvantage of requiring an extensive isolation and purification process in order to remove emulsifier, gel, residual polymerization modifiers such as mercaptans, etc. from the oily product. The complete removal of these impurities is imperative because otherwise their presence has a serious adverse effect on the drying properties of the oil and may also reduce the resistance of the resulting films or protective coatings to soap, water, caustic, grease, solvents, etc.

Still another method for preparing synthetic drying oils is known which involves the use of metallic sodium as the polymerization catalyst. This, however, has the disadvantage that it is severely limited in the use of co-reactants since monomers such as methyl acrylate, acrylonitrile and the like tend to poison the catalyst and hence preclude the possibility of modifying the properties of the final product. Still other disadvantages of the sodium polymerization are the poor color of the polymers as well as the well-known hazard of handling metallic sodium in substantial quantities.

We have now discovered a new and economically efficient method for preparing light-colored synthetic drying oils from diolefins. According to our invention, oily diolefin polymers or copolymers can be produced in bulk by the use of a peroxide catalyst under such conditions that about 35 to 70% of the monomer charge is converted into the desired drying oil. Our method is unusually flexible in that the molecular weight of these oily polymers can be most advantageously and accurately controlled within a wide range of predetermined limits below those of rubbery polymers by the proper selection of a diluent and/or other modifier, by adjusting the catalyst concentration of the feed and by keeping the conversion below 70%.

One of the principal advantages of our invention is the excellent yield in which the drying oil is obtained. This is attributable to the activity of peroxide catalysts which have been found to accelerate selectively the polymerization of the valuable charge in the direction of the desired linear oily polymers of relatively high average molecular weight, for instance 1000 to 10,000 or even as high as 20,000. By this selective catalysis the wasteful formation of cyclic diolefin dimers and brittle low molecular weight polymers of the latter is repressed to a relatively insignificant fraction of about 0.1 to 5% of the monomer charged, whereas in previously known related processes the dimer side-reaction was so extensive as to become prohibitive from an economical point of view. Another advantage of our invention lies in the fact that, in contrast to known methods, mercaptan or amine modifiers need not be employed to prevent the formation of solid or undesirably viscous polymers. Furthermore, in contrast with the previously mentioned sodium polymerization method, in our method sizable amounts of desirable co-reactants including methyl acrylate and vinyl cyanide may be used without poisoning the catalyst. A still further advantage is found in the clarity, unexpectedly light color, and freedom from odors of our oily products when stripped of dimer, whereas related products of the prior art required extensive purification to render them completely free from colored and/or odoriferous impurities. The flexibility of our process is illustrated by the accompanying drawing wherein:

Fig. 1 shows the effect of catalyst concentration in the feed on conversion;

Fig. 2 shows the effect of diluent concentration in the feed on the viscosity or molecular weight of the product;

Fig. 3 shows the effect of modifier concentration in the feed on the viscosity or molecular weight of the product;

Fig. 4 shows the effect of conversion on the viscosity or molecular weight of the product; and Fig. 5 shows the effect of diluent and catalyst concentrations in the feed on the viscosity of the product when polymerized in the absence of modifier.

In practicing our invention a polymerizable diolefin or a mixture of diolefins, or a mixture containing a diolefin and a polymerizable co-reactant containing a single C=C group and a catalytic amount of a peroxide type catalyst, with or without a diluent or other polymerization modifier, are charged into a pressure vessel and the vessel is then maintained at a superatmospheric pressure of about 3 to 20 or 30 atmospheres and at a temperature not in excess of 150° C., preferably between 80° and 125° C. The usual reaction period for such a polymerization has been found to be between 3 and 25 or even 60 hours, depending primarily on the catalyst concentration.

The product, an oily polymer or a solution of the polymer having a molecular weight preferably between 2000 and 5000, is then removed from the pressure vessel and the unreacted monomers are allowed to volatilize or are removed by distillation. When desired the viscosity of the product may be cut back by a diluent, adding, for instance, up to equal parts by volume of an inert solvent such as benzol, xylene, solvent naphtha, a petroleum hydrocarbon fraction boiling in the range of about 150° C. to 200° C. or other solvents suitable for diluting linear polymers of oily character. In general, for the most practical manner of application, these diluted drying oils should preferably have a viscosity of between about 1 and 3 poises at 50% N. V. M. (non-volatile matter).

Conversely, if a large amount of diluent was present during the polymerization reaction, it may be desirable to evaporate a portion or all of the diluent at the end of the polymerization period, or eventually replace the original diluent by another one. If the product is to be used as a protective film-forming coating, solvents boiling between about 100 to 200° C. are usually preferred, while solvents outside of this range may be useful if the product is intended for other uses, for example in printing ink formulations or for adhesives. Usual drying oils of natural origin and/or resins known in the coating art may also be added to our product, but such addition has not been found necessary because our drying oils themselves possess such excellent properties that such additional ingredients are of little benefit.

In preparing the drying oils of our invention, butadiene-1,3 is our preferred polymerizable raw material. Other useful polymerizable materials are isoprene, piperylene, the dimethylbutadienes and methylpentadienes, dicyclopentadiene, chloroprene, bromoprene, mixtures of any of the aforementioned diolefins, and generally all diolefins having from 4 to 6 carbon atoms per molecule.

Instead of polymerizing the diolefinic monomers alone, we may use mixtures of diolefins with monoolefins or polymerizable compounds containing a single C=C group, such as ethyl fumarate, ethyl maleate, methyl acrylate, methyl methacrylate, acrylonitrile, methacrylonitrile, vinyl acetate, vinyl chloride, vinylidene chloride, trichloroethylene, vinyl isobutyl ether, styrene, α methyl styrene, para-methyl styrene, all mono- and di-chloro-styrenes, chloromaleic anhydride and the like. The vinyl compounds are preferably present in minor proportions, e. g. 5 to 30% by weight of the total polymerizable mixture. In general, the presence of the above mentioned vinyl compounds in the monomeric mixture tends to accelerate the polymerization rate, especially in the case of acrylonitrile, styrene, or methyl methacrylate.

Another benefit obtained by polymerizing mixtures containing the above mentioned monoolefinic compounds is the lower unsaturation of the copolymerized product and hence improved aging properties, while the somewhat reduced drying rate can be brought up to the desired standards by incorporation of driers in the oil. Furthermore, especially in the case of acrylonitrile copolymers, the soap and caustic resistance of films resulting therefrom was found to be superior to the resistance of comparable diolefinic homopolymers, this advantage being somewhat balanced by a darker coloration of the product and by the increased complexity of the apparatus necessary for recovering unreacted monomers from the polymerization. At any rate, it will be seen from the foregoing description that by a judicious selection of monomers a wide variety of products can be obtained by our process, the character of the products being susceptible of still further control or modification by a proper variation of additional factors mentioned below.

In order to obtain economical yields of the desired oily polymers of the preferred molecular weight, we have found that the polymerization is best conducted at moderate temperatures, for instance, between 75 and 140° C., using relatively large amounts of a peroxide type catalyst. In particular we have found that cumene hydroperoxide having the formula

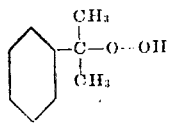

is unusually effective in catalyzing the reaction. This hydroperoxide may be used either in its chemically pure form or may equally well be in the form of the relatively inexpensive commercial mixture containing, for instance, 50 to 60 weight percent of cumene hydroperoxide and 50 to 40 weight percent of unconverted, inert cumene. The effectiveness of this catalyst is illustrated in Fig. 1 which shows that satisfactory yields of a good drying oil can be obtained by polymerizing butadiene-1,3 diluted with 30 volume percent of petroleum hydrocarbon solvent boiling between 150° and 200° C. in the presence of commercial cumene hydroperoxide. It is particularly interesting to note that the conversion can be raised rapidly from about 48.5% to 60% by raising the concentration of 60%-pure catalyst from 3 to 3.5 weight percent, whereas a further increase in catalyst concentration from 3.5 to 4.1 weight percent increases the conversion only to 65% under otherwise identical conditions. From this relation it can be readily determined that for the purposes of our invention the catalyst is best used in amounts ranging from about 1 to 7 weight percent, calculated as pure cumene hydroperoxide, and preferably from 2.5 to 4 weight percent based on polymerizable monomers.

Alternatively, the useful range of concentration of peroxide type catalysts generally can be defined for the purposes of the present invention as being between 0.3 and 3 mol percent of active catalyst ingredient based on the monomer, preferably between 1 and 1.5 mol per cent.

Besides cumene hydroperoxide, catalysts which possesses a similarly outstanding effectiveness in the process of our invention include t-butyl hydroperoxide, ortho-, meta-, or para-cymene hydroperoxide, t-butyl perbenzoate and cumene perbenzoate. All of these compounds can be represented by the general formula

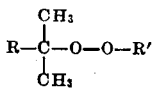

wherein R is selected from the group consisting of methyl, phenyl and tolyl and wherein R' is selected from the group consisting of hydrogen and benzoyl. Hence it will be seen that our preferred catalysts are characterized by having the —O—O— group linked to a tertiary carbon atom and further characterized by the total absence of secondary hydrogen atoms from the molecule.

However, other peroxides which are hydrocarbon soluble, such as acetyl peroxide, methylethyl ketone hydroperoxide, benzoyl peroxide, t-amyl hydroperoxide or perbenzoate and the like are also useful, though being only about one-half as effective on a molar basis as the aforementioned preferred compounds.

In carrying out the invention we have found that 20 to 100 or even 400 percent by weight or liquid volume (based on polymerizable liquid monomer) of an inert diluent has a highly beneficial effect in keeping the molecular weight of the product in the fluid range. Our preferred diluents are butane, xylene, benzol, toluene, cyclohexane, solvent naphtha, or a petroleum hydrocarbon fraction boiling between 150 and 200° C., or generally non-olefinic hydrocarbon solvents boiling between —15° C. and 200° C. On the other hand, solvents such as carbon tetrachloride, chloroform, halogenated hydrocarbons boiling between 60 and 20° C. generally, and olefinic solvents may be also used but are not inert toward the reaction. The halogenated solvents may sometimes be preferred over the inert ones because they exert a modifying effect on the polymerization reaction without seriously affecting the reaction rate, but isobutylene and the normal butenes lower the catalyst efficiency and tend to result in low conversions.

In all cases, conversion as well as viscosity of the product was affected somewhat by the amount of diluent used so that, for instance, when butadiene was polymerized with 2.8 weight percent of tertiary butyl hydroperoxide, using in the feed 15% by volume of a petroleum hydrocarbon diluent (boiling range 150 to 200° C.) a 61% conversion was obtained in 40 hours at 90° C., whereas the conversion fell to 52% when the butadiene was diluted with 37 volume percent of the same diluent, other conditions being the same. Simultaneously, the viscosity of the product dropped from 6.5 poises in the 15%-dilution run to 4.6 poises in the 37%-dilution run, the viscosities being determined on the oily product after adjustment of the polymer concentrations in the diluent to a comparable basis of 50% non-volatile matter, or from about 2 to 1 poises when determined on samples adjusted to 35% non-volatile matter. These latter data showing that the viscosity of the product can be cut in half by increasing the proportion of diluent in the feed about 15 volume per cent (based on butadiene) to about 35 volume per cent are graphically represented in Fig. 2 which thus illustrates a very favorable manner of controlling the progress of the polymerization and the properties of the product.

Fig. 5 similarly shows the general effect of diluent concentration in the feed on the viscosity of the resulting polymer solution under somewhat different polymerization conditions than those on which Fig. 2 was based. In particular it is to be noted that in the runs represented in Fig. 5 the diluent was present in amounts ranging from 50 to 80 volume per cent based on butadiene, relatively high polymerization temperatures and correspondingly short polymerization times were used, no sulfur modifier was added and 50%-pure cumene hydroperoxide was employed in concentrations up to 8.4 weight per cent (equal to 4.2 weight per cent of active ingredient). Fig. 5 clearly shows that an increase of diluent in the feed from 50 to 80 volume per cent reduces the viscosity of the resulting polymer solution (adjusted in each case to 50% N. V. M.) to less than one third.

Furthermore, Fig. 5 is especially illuminating in showing that a noticeable reduction of product viscosity or molecular weight can also be obtained by an increase in catalyst concentration, thereby demonstrating that diluent ratio and catalyst concentration can be selected to mutually complement each other's effects to the best advantage. Thus, for instance, Fig. 5 shows that a 50% N. V. M. solution having a viscosity of 2 poises can be produced under otherwise identical conditions either by employing about 66 volume per cent of diluent and 8.4 weight per cent of catalyst in the feed, or by employing about 73 volume per cent of diluent and only 6.3 weight per cent of catalyst, the preferred selection being dictated principally by economical considerations.

Another interesting point to be remembered is that the viscosity of the product is a measure of the molecular weight M of the polymer, and hence the latter can be calculated from the former according to the following formula: $[n] = 11 \times 10^{-4} \times M^{0.62}$ wherein $[n] = \ln N/C$, N being the ratio of the viscosity of the polymer solution to the viscosity of the solvent (benzene) and C being the concentration of the solution expressed as grams of polymer per 100 cc. of solution. In thus determining the molecular weights it is preferable to adjust the concentration C to give N values between 1.1 and 1.4.

The viscosity of the product can also be controlled by adding to the monomeric polymerization mixture, 0.3 to 5 weight percent of diisopropyl xanthogen disulfide (hereinafter also referred to as DXD) which is preferred for this purpose because it is outstanding in that it does not affect the reaction rate appreciably. Among other modifiers useful in our process, flowers of sulfur (which probably are converted into other compounds such as thiophene during the course of the polymerization) have also been found quite effective in keeping the viscosity of the polymeric product in the preferred range between 1 and 5 poises, but this use of sulfur can be disadvantageous because of the malodorous by-products formed.

Still another effective modifier is carbon tetrachloride which can be used in amounts as high as 100% by volume of the polymerizable material and which in addition to its normal effect as a diluent can influence the polymerization by playing a more vigorous role in the mechanism of active chain transfer and/or termination. Actually the main reason for employing any diluent at all is to reduce the molecular weight of the polymer by just such means. Furthermore, the nature of the diluent is also known to affect the rate at which any particular catalyst decomposes to supply the free radicals necessary for the polymerization, but the tertiary type catalyst appears to be relatively insensitive to these variations.

The general effect of modifier concentration on product viscosity is illustrated in Fig. 3 which shows that product viscosity can be reduced drastically by adding up to about 1.5% of DXD modifier (by weight of butadiene) to the monomeric charge.

The following specific examples are still further descriptive of the present invention which gives excellent yields of linear, water-white oily polymers in an economical manner, with only about 0.1 to 4 weight percent of the diolefin charge going to dimer. No treatment is required to improve the color or odor of the resulting products, which are highly satisfactory, dry well and form superior varnish-like finishes when baked or air dried. It will be understood that these examples are presented only as illustrations and not as limitations of our invention.

*Example I*

100 parts by weight of butadiene-1.3 (98% purity), 54 parts by weight of a petroleum thinner boiling between 150° C. and 200° C. (Varsol), 3 parts by weight of t-butyl hydroperoxide (60% purity) and 0.75 part by weight of diisopropyl xanthogen disulfide were charged to a stainless steel reactor having a 25% excess capacity at room temperature. This mixture was heated for 40 hours at 90° C. under its autogenous pressure (about 200 p. s. i. max.) whereupon the residual pressure was released, the reactor opened and the unreacted butadiene was then allowed to volatilize at 70° C. The resulting product was found to consist of 60 parts by weight of oily polymer, 4 parts by weight of dimer, (vinyl-cyclohexene), plus the solvent and some t-butyl alcohol. The clear, water-white, oily product was fractionated to remove the dimer and then was found to have a viscosity of 11.0 poises after adjusting its concentration to 50% N. V. M. Intrinsic viscosity measurements indicated that the oily polymer itself had a molecular weight of about 8,000 to 10,000.

On adding 0.3% lead naphthenate and 0.03% (by weight) of manganese naphthenate as driers to the oily product, films of 0.5 to 1.0 mil thickness, prepared by dipping a thin metal sheet into the oil, dried in air dust-free in 4 hours, the dried films being characterized by a high gloss. Films baked for one hour at 125° C. in the absence of any drier possessed superior flexibility, adhesion, and hardness and were found to be very resistant to water, soap and grease. Alkali resistance was fair. Air-dried films, after 48 hours, were slightly inferior to the baked coatings, but generally good except for resistance to alkali.

Fadeometer tests at 140° F. for 300 hours revealed no visible checking or other sign of deterioration of either the air-dried or baked films, except for a slight yellowing.

*Example II*

80 parts by weight of butadiene, 20 parts by weight of methyl methacrylate, 54 parts by weight of petroleum thinner (boiling range 150–200° C.), 3 parts by weight of t-butyl hydroperoxide and 1.25 parts by weight of diisopropyl xanthogen disulfide were heated in a stainless steel reactor under pressure (about 180 p. s. i. max.) for 60 hours at 80° C. to obtain a 65% conversion to oily copolymers based on the diolefin and methacrylate charged. At the end of the run residual pressure was released and the reactor opened. Unreacted monomer consisting mostly of butadiene was stripped from the oily reactor contents which were thereafter fractionated to remove the dimer (about 1% per weight of butadiene charged) formed in the reactor. The de-dimerized oil solution was finally filtered to make certain that the product was freed from all solid precipitate such as insoluble polymer which may form on occasion in hardly perceptible amounts. In this run 65% of the total monomers charged was converted into the desired oily copolymer which again was water-white and of similar consistency as the oil of Example I.

When the usual amount of driers was added to the oil the resulting films were found to dry more slowly than the straight polybutadiene of Example I and were also softer. However, the drying rate of these films could be raised readily by adding to the oil increased amounts of driers. Fadeometer tests showed that the yellowing tendency of the copolymer films was greatly reduced as compared with the polybutadiene films of Example I, but the soap resistance of both baked and air-dried panels was somewhat inferior.

*Example III*

80 parts by weight of butadiene, 20 parts by weight of styrene and 3 parts by weight of t-butyl perbenzoate were mixed together with 100 parts by weight of commercial xylene and one part by weight of diisopropyl zanthogen disulfate. The mixture was heated for 14 hours at 100° C. in a closed stainless steel reactor under the self-generated pressure of the mixture (about 210 p. s. i. maximum). At the end of the run the residual pressure was released and the reactor opened. Unreacted monomer consisting mostly of butadiene was stripped from the reactor contents which were thereafter fractionated to remove the butadiene dimer (about 2% per weight of butadiene charged) and sufficient xylene to give a polymer solution of about 50% N. V. M. and a viscosity of 1.4 poises. The yield of polymer was 64 parts by weight. This dilute solution was again spread on metal panels as described above and, after addition of the same amount of driers, was found to dry equally fast as the comparable films of Example I. The resulting air-dried films were equivalent to those described in Example I except that they had superior aging properties as determined by extended exposure to actual atmospheric elements. Also they showed less tendency to yellow when tested in the fadeometer. However, in contrast to the polybutadiene oil of Example I, it was found necessary to add driers to the copolymer solution of this example in order to obtain a tack-free baked coating in one hour at 125° C.

*Example IV*

100 parts by weight of butadiene, 54 parts by weight of petroleum thinner (B. R. 150–200° C.), 3.5 parts by weight of commercial cumene hydroperoxide (60% pure) and 0.9 part by weight of diisopropyl xanthogen disulfide as modifier, were heated under pressure (210 p. s. i. max.) for 22 hours at 100° C. to obtain a solution containing 60 parts by weight of oily polymer and 3.5 parts of vinyl cyclohexene. The resulting solution contained 39.2% of non-volatile matter and had a viscosity of 2.3 poises after stripping the unreacted butadiene. Employed directly as a varnish coating the films were similar in all respects to those prepared in Example I.

*Example V*

100 parts by weight of butadiene, an equal volume (123 parts by weight) of a petroleum diluent having a boiling range of 150–200° C. and 8.5 parts by weight of commercial cumene hydroperoxide (50% purity) were charged to a stainless steel reactor and heated under self-generated pressure for 15 hours at 100° C. The maximum pressure was about 180 p. s. i. At the end of the run unpolymerized butadiene was stripped from the crude product at 70° C. and the polymer concentration brought to 50% by vacuum distillation of the diluent. Conversion was 64% of the butadiene charged and the viscosity of the resulting solution was 3.0 poises.

*Example VI*

100 parts by weight of butadiene, 370 parts by weight of a petroleum diluent boiling between 150–200° C. (volume ratio of butadiene to diluent=1:3) and 6.3 parts by weight of commercial sumene hydroperoxide (50% purity) were charged to a stainless steel reactor and heated under autogeneous pressure for 6 hours at 130° C. The maximum pressure was about 150 p. s. i. Unreacted butadiene and excess diluent were removed by distillation to give a polymer solution having a viscosity of 1.8 poises at 50% N. V. M. Conversion to polybutadiene was 57%. This product dried dust-free in 3 to 4 hours and set to touch in 5 to 6 hours, thus having a drying rate equivalent to those described previously which had viscosities ranging from 3.0 to 11 poises at 50% N. V. M.

*Example VI–A*

325 parts by weight of butadiene-1,3 and 20 parts by weight of commercial cumene hydroperoxide (50% pure) were charged to a stainless steel bomb and heated under self-generated pressure for 13 hours at 100° C. in the absence of any diluent or modifier. At the end of the run the viscous crude polymeric product was removed from the bomb by rinsing with a petroleum solvent boiling between 150° C. and 200° C., the resulting solution of polymer in petroleum solvent was stripped of unpolymerized butadiene at 70° C. and the stripped solution was adjusted to a concentration of 50%. The viscosity of this 50% N. V. M. solution was found to be 7.6 poises and the conversion was 67% of the butadiene charged.

When the viscous product was completely removed from the bomb, a slight but nevertheless significant amount of insoluble solid and/or gel-like polymer was noticed on the bomb walls, whereas in the previously described examples substantially all of the polymer was found to be in soluble form. While this formation of insoluble polymer was of little practical importance in batch-type operations, it seems safe to predict that this would be a decided disadvantage in continuous operations since it is known that once such formation of insoluble polymer had begun in a reactor, it proceeds at an ever increasing rate and often interferes seriously with the operation of the process. Thus it will be readily appreciated that the use of a diluent in the polymerization is preferred not only to keep the product viscosity within a desirably low range, but furthermore such diluents significantly diminish operational difficulties arising from the formation of insoluble polymers. Other advantages of operating with diluents are the improved ease of handling the product, facilitation of heat transfer, safety, etc.

The 50% N. V. M. oily solution of polymer obtained in Example VI–A, when applied to a substratum in the form of a thin coating, dried dust-free in less than 3 hours and set to touch in about 3 hours, thus being somewhat faster drying than similar compositions described in the preceding examples, but the properties of the resulting film were approximately the same.

In all of the present examples it was preferred to limit conversions to no higher than 70% or 80% since products of relatively low viscosity were desired. On the other hand, high conversions may be preferred in connection with our process where it is desired to obtain products of higher molecular weight inasmuch as the viscosity and hence the molecular weight increases at an accelerated rate when conversions are carried beyond 70% as shown in Fig. 4.

In view of the exceptionally favorable properties of the clear films obtained upon drying the oily products of our invention, the products are particularly suitable as vehicles for paints and enamels to which any desired color may be imparted by admixing an appropriate pigment therewith. Conventional driers such as compounds of lead, manganese or cobalt may also be added to accelerate the rate of drying in air, but addition of such driers is usually unnecessary in the case of baked enamels. In general, enamels prepared from our product dry in air to form films with excellent gloss and color, satisfactory flexibility and strong adhesiveness. The films present a hard, smooth, waxy, mar-proof surface.

*Example VII*

100 parts by weight of butadiene, 250 parts by weight of carbon tetrachloride (equal to the volume of butadiene) and 4.2 parts by weight of commercial cumene hydroperoxide (50% purity) were charged to a stainless steel bomb and heated for 22 hours at 100° C. under the self-generated pressure of the feed mixture. The oily polymer solution was recovered as described in previous examples and a 59% conversion to polymer based on the butadiene charged was obtained. Upon vacuum distillation of the carbon tetrachloride from polymer solution and replacement of the carbon tetrachloride by a petroleum thinner boiling between 150 and 200° C., a 50% by weight solution of the polymer in said thinner had a viscosity of 1.7 poises and the oily polymer itself contained 8.2 weight percent of combined chlorine.

Repeating the above example under identical conditions except that the catalyst concentration was increased to 6.3 parts of the commercial cumene hydroperoxide, the viscosity of the resulting polymer in a 50% solution of the petroleum thinner decreased to 1.1 poises while the conversion to polymer increased to about 65% based on the butadiene charged. This favorable decrease of product viscosity with increasing catalyst concentration is the feed is quite general as applied to our invention and is further illustrated by the subsequent example.

*Example VIII*

1000 grams of liquid butadiene and an equal volume (1230 grams) of a petroleum thinner boiling between 150 and 200° C. were heated with varying amounts of pure cumene hydroperoxide in a closed reactor for 16 hours at 100° C. and the following results were obtained on the resulting polymeric drying oil:

| Catalyst Concentration (weight per cent of butadiene charged) | Viscosity of Polymer Oil (poises at 50% N. V. M.) | Conversion (Per Cent) |
| --- | --- | --- |
| 2.1 | 7 | 39 |
| 3.2 | 4 | 55 |
| 4.2 | 2.5 | 60 |

These results show clearly the reduction of product viscosity with increasing catalyst concentration. Furthermore, inasmuch as the catalyst concentration affects not only the viscosity but also the conversion as shown in the above table and as discussed previously in connection with Fig. 1, it is even more significant to examine the effect of catalyst concentration on product viscosity at constant conversion which can be accomplished by increasing the reaction times at the lower concentrations. Thus, when the above described mixture of butadiene and petroleum thinner was polymerized with varying amounts of pure cumene hydroperoxide at 100° C. for a reaction period which would lead in each case to a conversion of 60%, the following results were obtained:

| Catalyst Concentration (weight per cent of butadiene charged) | Viscosity (poises at 50% N. V. M.) | Reaction Time (hours) |
| --- | --- | --- |
| 2.1 | 13 | 24 |
| 3.2 | 5 | 19 |
| 4.2 | 2.5 | 16 |

Thus it can be seen from the above table that at equal conversion (60%) a raising of the catalyst concentration from 2.1 to 4.2% brings about a decrease of viscosity from 13 to 2.5 poises while simultaneously cutting the reaction time from 24 to 16 hours. Hence, the possibility of controlling product viscosity by adjustment of catalyst concentration is most clearly illustrated, simultaneously showing the economically important reduction of polymerization time obtained by such an increase in catalyst concentration.

*Example IX*

When half the amount of the carbon tetrachloride of the feed mixture described in Example VII was replaced by an equal volume (61.5 parts by weight) of a petroleum thinner boiling between 150–200° C., otherwise maintaining the same conditions as those of Example VII, the viscosity of a 50% solution of the resulting oily polymer in such a petroleum solvent was found to be 4.2 poises as compared with a product viscosity of 1.7 poises in Example VII. The combined chlorine content of the polymer was about 7 weight percent.

When three-quarters of the amount of carbon tetrachloride of the feed mixture described in Example VII were replaced by an equal volume (92.5 parts by weight) of the petroleum thinner boiling between 150–200° C., otherwise maintaining the same conditions as before, the viscosity of a 50% solution of the resulting oily polymer in the petroleum thinner was found to be 4.6 poises while the chlorine content of the polymer was decreased to about 6 weight per cent. This example then illustrates that the viscosity of the product can also be greatly influenced by the proportion of a halogenated diluent such as carbon tetrachloride in the feed. It further illustrates that carbon tetrachloride modifies the polymerization much more profoundly than and in a manner different from the inert diluents mentioned before; the chlorine content of the finished polymer indicates that the carbon tetrachloride actually takes part in the reaction and forms an integral component of the finished product. All of the products prepared in the presence of carbon tetrachloride were also capable of yielding satisfactory protective coatings which had especially excellent water resistance and approximately the same other properties as those of coatings described in the other examples hereof.

In addition to the examples described previously, a large number of drying oils similarly prepared according to our invention were evaluated as air-dried films. For this purpose a film-like coating of the oily materials was applied to flat metal panels. The air-dried films (0.5–1 mil thickness) were prepared from 50% N. V. M. solutions of our oily polymers, in a petroleum thinner of the type above described after addition of 0.3% lead naphthenate and 0.03% manganese naphthenate (based on weight of solution) and were tested after 48 hours of drying at room temperature.

Drying rate, water, soap, grease, caustic resistance, comparative hardness, flexibility and color of the dried films were determined subsequently as follows:

*Water resistance.*—A piece of filter paper was placed on top of the tested film and a small amount of water dropped on the paper. The wet paper was left in contact with the film for 5 hours.

*Soap resistance.*—A drop of 2% solution of commercial sodium soap was formed on a filter paper lying on top of the tested film and the wet paper left in contact with the film for 2 hours.

*Grease resistance.*—A piece of filter paper saturated with a 50–50 mixture of butter an oleic acid was left in contact with the film for 2 hours.

*Caustic resistance.*—A piece of filter paper on which a drop of a 1% aqueous solution of NaOH had been dropped was left in contact with the tested film for one hour.

*Hardness.*—Determined by a comparative thumb nail test.

*Flexibility.*—A metal panel on which the tested film had been formed was bent through a 180° angle and the coating was inspected for cracks, peeling of film, etc.

*Color.*—By visual inspection.

The characteristic evaluation data obtained on a large number of samples according to the above testing procedures are summarized in the following table wherein the films prepared from the novel drying oils of our invention are compared with standard commercial enamels of the modified phenolic or alkyd types, and also with butadiene drying oils prepared by other polymerization techniques. The results are rated, according to an arbitrary scale on which 0 represents excellence or freedom from chemical or mechanical effect and 9 represents failure.

The table summarizes average evaluation data obtained on samples of the following clear varnishes.

A—Drying oil of invention; petroleum thinner (boiling range 150–200° C.); 50% non-volatile material by weight.

B—Alkyd resin (13% phthalic acid minimum) in linseed oil; petroleum thinner (boiling range 150–200° C.); 50% N. V. M.

C—Modified phenolic (25 weight per cent of phenolic resin, 75 weight per cent of ester gum) in linseed oil; length 25 gallons of oil per 100 pounds of resin; petroleum thinner (boiling range 150–200° C.); 50% N. V. M.

D—Sodium polymerized polybutadiene oil obtained by a procedure based on U. S. Patent 2,264,811; petroleum thinner (boiling range 150–200° C.); 50% N. V. M.

E—Emulsion polymerized polybutadiene oil; petroleum thinner (boiling range 150–200° C); 50% N. V. M.

F—Oil obtained by thermally polymerizing vinyl cyclohexene (butadiene dimer); petroleum thinner (boiling range 150–200° C.); 50% N. V. M.

| VARNISH | A | B | C | D | E | F |
|---|---|---|---|---|---|---|
| Drying rate | [1] 0–5 | 3–5 | 0–5 | 0–5 | 5–9 | 2–4. |
| Color | water-white clear | yellow | dark yellow | red | amber | yellow. |
| Water | 0–4 | 0–3 | 0–3 | 0–5 | 4–9 | 2–8. |
| Soap | 0–5 | 0–5 | 0–5 | 3–9 | 9 | 3–9. |
| Grease | 0 | 0–2 | 0–2 | 0–2 | 0–4 | 3–6. |
| Caustic | 5–7 | 7–9 | 7–9 | 6–9 | 9 | 0. |
| Flex | 0–3 | 0–3 | 0–3 | 0–5 | 0–3 | 5–9. |
| Hardness: | | | | | | |
| 1 day | 3–7 | 3–5 | 3–5 | 3–5 | | |
| 30 days | 0–3 | 3–5 | 3–5 | 3–5 | 3–7 | 0–3. |

[1] Tack-free in air in 3 to 8 hours.

The above data show that films prepared from the drying oils of our invention excel in retaining their clear, water-white color on drying. Also they show superior hardness after 30 days and relatively good resistance to caustic and grease while matching alkyd resin films or modified phenolic films in flexibility and water resistance. All in all the results show that the novel drying oils are well suited for the formulation of paint and varnish compositions, thereby answering a real need for the industry which in recent years has continued its search for materials adapted to take the place of drying oils of natural origin the supply of which has been growing increasingly inadequate during recent times. Enamels prepared from our novel drying oils are readily modified by the addition of pigments, lakes and oil soluble dyes, and can be extended or mixed with common hydrocarbon solvents. Furthermore, while our oily products themselves dry to yield hard resistant films, they can be further modified by mixing therewith additional known resins.

Having described only a limited number of typical embodiments of our invention, it is possible to produce still other embodiments without departing from the inventive concept described herein and defined by the appended claims.

We claim the following as our invention:

1. In a selective polymerization process for preparing drying oils the improvement which consists essentially of the steps of heating a conjugated diolefin of 4 to 6 carbon atoms at a temperature between 50 and 150° C., under a pressure ranging from 3 to 30 atmospheres and in the presence of 1 to 3 mol percent per mol of monomer of a hydrocarbon soluble catalyst having the formula

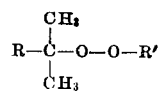

wherein R is a member selected from the group consisting of methyl and phenyl and R' is a member selected from the group consisting of hydrogen and benzoyl, for a period sufficient to convert a major proportion but not more than 80% of the diolefin into a linear oily polymer having a molecular weight between 1000 and 20,000.

2. A process according to claim 1 wherein 1 volume of diolefin is polymerized in the presence of ⅕ to 5 volumes of a non-olefinic diluent boiling between —15° C. and 200° C. and selected from the group consisting of hydrocarbons and halogenated hydrocarbons.

3. In a process for preparing drying oils the improvement which consists essentially of heating butadiene-1,3 at a temperature between 50 and 150° C. in a closed zone under its autogenous pressure in the presence of 1 to 1.5 mol percent per mol of butadiene of a catalyst having the formula

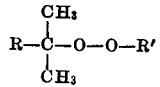

wherein R is a member selected from the group consisting of methyl and phenyl and R' is a member selected from the group consisting of hydrogen and benzoyl, and continuing the heating until a linear oily polymer having a molecular weight between 1000 and 10,000 is formed from a major proportion of monomer charged.

4. A process according to claim 3 wherein the catalyst is cumene hydroperoxide.

5. A process according to claim 3 wherein the catalyst is t-butyl hydroperoxide.

6. A process according to claim 3 wherein 0.3 to 5 weight percent based on butadiene of diisopropyl xanthogen disulfide is added to the polymerizable charge.

7. In a process for preparing drying oils, the improvement which consists essentially of mixing 70 to 95 parts by weight of a conjugated diolefin having 4 to 6 carbon atoms per molecule and 30 to 5 parts by weight of a copolymerizable compound having a single —C=C— group, and heating the resulting mixture at a temperature between 50 and 150° C. and at a pressure ranging from 3 to 30 atmospheres in the presence of 1 to 3 mol percent per total monomer of a catalyst having the formula

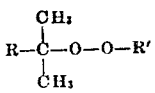

wherein R is a radical selected from the group consisting of methyl and phenyl and wherein R' is a radical selected from hydrogen and benzoyl, until a major proportion of monomer is converted to a water-white linear oily copolymer having a molecular weight between 2000 to 10,000.

8. In a process for selectively converting diolefins into unsaturated oily polymers the improvement which consists essentially of heating one volume of liquid butadiene monomer with ⅕ to 5 volumes of a hydrocarbon diluent boiling between 80 and 200° C., and 2.5 to 4 weight percent of cumene hydroperoxide based on monomer, heating the mixture for 3 to 60 hours in a closed polymerization zone at a temperature between 80 and 125° C. at the autogenous pressure whereby a major proportion of monomer is converted into a hydrocarbon soluble drying oil and only between 0.1 and 5% by weight of monomer is converted into dimer and 0 to 1% into insoluble polymer, releasing pressure from the polymerization zone, stripping unpolymerized monomer from the polymerized reaction mixture, fractionating the stripped mixture to remove the dimer therefrom, and recovering a solution of said drying oil in said hydrocarbon diluent.

9. In a selective process for the production of a synthetic drying oil the improvement which consists essentially of mixing 70 to 95 parts by weight of butadiene, 30 to 5 parts by weight of styrene, 20 to 100 parts by weight of an inert, non-olefinic hydrocarbon diluent boiling between 80 and 200° C. and 2.5 to 7 parts by weight of cumene hydroperoxide, heating the resulting mixture for 3 to 25 hours in a closed polymerization zone at a temperature between 80 and 125° C. at a pressure of 3 to 20 atmospheres, whereby 35 to 70% by weight of the monomers is converted into a hydrocarbon soluble drying oil and only between 0.1 to 5% by weight of the monomers is converted into a cyclic dimer, releasing pressure from the polymerization zone, removing unpolymerized monomers and the cyclic dimer from the polymerized reaction mixture, and recovering said drying oil as a solution in said hydrocarbon diluent.

ERVING ARUNDALE.
ANTHONY H. GLEASON.
FRED W. BANES.

REFERENCES CITED

The following references are of record in the file of this patent:

UNITED STATES PATENTS

| Number | Name | Date |
| --- | --- | --- |
| 1,683,404 | Ostromislensky | Sept. 4, 1928 |
| 2,131,195 | Schneider et al. | Sept. 27, 1938 |
| 2,151,382 | Harmon | Mar. 21, 1939 |
| 2,252,333 | Rothrock | Aug. 12, 1941 |
| 2,301,668 | Pier et al. | Nov. 10, 1942 |
| 2,398,105 | Mack | Apr. 9, 1946 |
| 2,427,847 | Fryling | Sept. 23, 1947 |
| 2,429,582 | Morris et al. | Oct. 21, 1947 |

FOREIGN PATENTS

| Number | Country | Date |
| --- | --- | --- |
| 328,908 | Great Britain | May 1, 1930 |
| 363,348 | Great Britain | Dec. 7, 1931 |
| 545,193 | Great Britain | May 14, 1942 |
| 545,765 | Great Britain | June 11, 1942 |